(12) United States Patent
Isomura et al.

(10) Patent No.: US 9,317,145 B2
(45) Date of Patent: Apr. 19, 2016

(54) INFORMATION PROCESSING APPARATUS, INFORMATION PROCESSING METHOD, AND COMPUTER READABLE MEDIUM

(71) Applicant: CASIO COMPUTER CO., LTD., Shibuya-ku, Tokyo (JP)

(72) Inventors: Kunihiko Isomura, Tokyo (JP); Tatsuzi Ichikawa, Saitama (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 14/217,958

(22) Filed: Mar. 18, 2014

(65) Prior Publication Data

US 2014/0285451 A1  Sep. 25, 2014

(30) Foreign Application Priority Data

Mar. 21, 2013  (JP) .................................. 2013-058982

(51) Int. Cl.
| | |
|---|---|
| *G06F 3/041* | (2006.01) |
| *G06F 3/0354* | (2013.01) |
| *G06F 3/0488* | (2013.01) |
| *G06F 3/044* | (2006.01) |
| *G06F 3/046* | (2006.01) |

(52) U.S. Cl.
CPC ............ *G06F 3/03545* (2013.01); *G06F 3/044* (2013.01); *G06F 3/046* (2013.01); *G06F 3/0488* (2013.01); *G06F 2203/04106* (2013.01)

(58) Field of Classification Search
None
See application file for complete search history.

(56) References Cited

U.S. PATENT DOCUMENTS

2013/0006957 A1*  1/2013  Huang et al. .................. 707/706

FOREIGN PATENT DOCUMENTS

| JP | 2010-261989 | 11/2010 |
| JP | 2012-008917 | 1/2012 |

* cited by examiner

*Primary Examiner* — Joseph Haley
(74) *Attorney, Agent, or Firm* — Amin, Turocy & Watson LLP; Gregory Turocy

(57) ABSTRACT

An information processing apparatus includes: a display device including a touch panel configured to detect a touch position where the touch panel is touched by a user operation, wherein display information is displayed on the display device; a display information storage unit configured to store the display information; an information display controller configured to display the display information on the display device; a touch position acquisition unit configured to acquire the touch position in response to the user operation on the display information; a region setting unit configured to set a certain region in the display information based on the touch position; a target information extraction unit configured to extract a target information from the certain region; a target information storage unit configured to store the target information; and a target information display controller configured to display the target information on the display device.

11 Claims, 12 Drawing Sheets

FIG.12
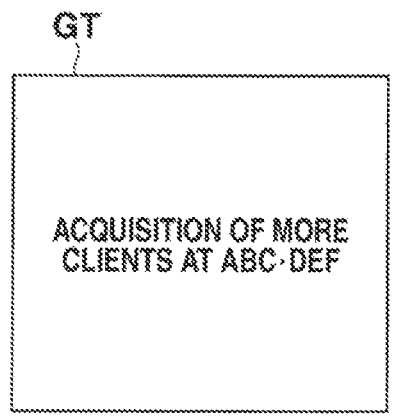
FIG.13
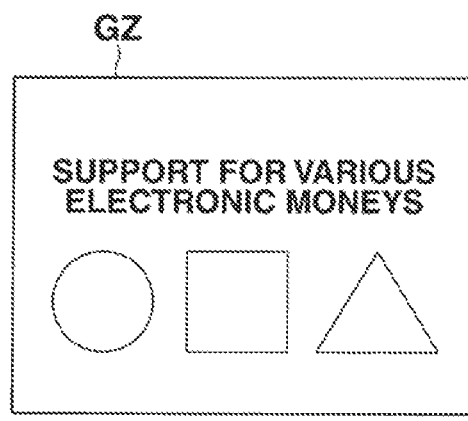
FIG.14
| | 19 | |
|---|---|---|
| 19S1 | ACQUISITION OF MORE CLIENTS AT ABC·DEF | (T) |
| 19S2 | SUPPORT FOR VARIOUS ELECTRONIC MONEYS | (Z) |
| 19C1 | – – – – | (P) |

INFORMATION PROCESSING APPARATUS, INFORMATION PROCESSING METHOD, AND COMPUTER READABLE MEDIUM

CROSS-REFERENCE TO RELATED APPLICATION

This application claims priority from Japanese Patent Application No. 2013-058982, filed on Mar. 21, 2013, the entire contents of which are hereby incorporated by reference.

BACKGROUND

1. Technical Field

The present disclosure relates to an information processing apparatus, an information processing method, and a computer readable medium.

2. Description of the Related Art

In the related art, in case of a presentation for merchandise explanation, a person who made the presentation would analyze the situation at the time of the presentation and record information such as what the person presented chiefly actually in materials used in the presentation or what clients paid attention to in the materials.

As apparatuses through which participants can easily confirm contents serving as essential parts in a presentation or the like, there have been conceived a pointer pointed at a material which is displayed on a screen by a projector, and an image processing apparatus in which such a pointer and the position thereof are detected and options to select the position of the detected pointer are displayed on a touch panel so that whenever an option is selected on the touch panel, a material corresponding to the position of the pointer associated with the selected option is displayed on the touch panel (for example, see JP-A-2010-261989).

A data retrieval apparatus holds objects displayed on a display device in association with information about the display positions of the objects. When a user then touches a touch panel and draws a retrieval region thereon, an object associated with the display position of the retrieval region is retrieved and displayed on the display device (for example, see JP-A-2012-008917).

In the related art, there has been considered a technique in which a position designated in response to an operation of a user on a screen where some information is displayed is stored in association with contents of information displayed at the position, so that the information of the contents corresponding to the position on the screen can be displayed in response to an operation which will be performed by the user.

In such a related art technique, however, of contents displayed in the past, only the information of contents the user paid attention to can be simply displayed again as it is, based on the position where the information of the contents the user paid attention to had been displayed.

Therefore, it is impossible to know which information drew attention among the information which had been displayed in the past.

SUMMARY OF THE INVENTION

One of illustrative aspects of the present invention is to provide an information processing apparatus and an information processing method, which can record and display attention keyword among display information displayed in the past, and a computer readable medium storing a control program for the information processing apparatus and the information processing method.

According to one or more illustrative aspects of the present invention, there is provided an information processing apparatus comprising: a display device comprising a touch panel configured to receive a user operation and detect a touch position where the touch panel is touched by the user operation, wherein display information is displayed on the display device; a display information storage unit configured to store the display information; an information display controller configured to display the stored display information on the display device; a touch position acquisition unit configured to acquire the detected touch position in response to the user operation on the display information displayed on the display device; a region setting unit configured to set a certain region in the display information based on the acquired touch position; a target information extraction unit configured to extract a target information from the certain region of the display information; a target information storage unit configured to store the extracted target information; and a target information display controller configured to display the stored target information on the display device.

According to one or more illustrative aspects of the present invention, there is provided an information processing method for controlling a computer comprising a display device comprising a touch panel configured to receive a user operation and detect a touch position where the touch panel is touched by the user operation, wherein display information is displayed on the display device. The method comprises: (a) storing the display information in a display information memory; (b) displaying the stored display information on the display device; (c) acquiring the detected touch position in response to the user operation on the display information displayed on the display device; (d) setting a certain region in the display information based on the acquired touch position; (e) extracting a target information from the certain region of the display information; (f) storing the extracted target information in a target information memory; and (g) displaying the stored target information on the display device.

According to one or more illustrative aspects of the present invention, there is provided a non-transitory computer-readable medium storing a program for causing a computer to perform predetermined operations, wherein the computer comprises a display device comprising a touch panel configured to receive a user operation and detect a touch position where the touch panel is touched by the user operation, wherein display information is displayed on the display device. The predetermined operation comprises: (a) storing the display information in a display information memory; (b) displaying the stored display information on the display device; (c) acquiring the detected touch position in response to the user operation on the display information displayed on the display device; (d) setting a certain region in the display information based on the acquired touch position; (e) extracting a target information from the certain region of the display information; (f) storing the extracted target information in a target information memory; and (g) displaying the stored target information on the display device.

Other aspects and advantages of the present invention will be apparent from the following description, the drawings and the claims.

BRIEF DESCRIPTION OF DRAWINGS

FIGS. 9A and 9B are views showing a specific display operation on the presentation screen 14g in accordance with the keyword extraction process of the keyword extractor 10, wherein FIG. 9A is a view showing touch operation positions T1 to T3 touched by a finger, a touch operation position P1 touched by a pen and an enlargement operation region Z1 on the presentation screen 14g displayed on a display device 12, and FIG. 9B is a view showing an enlarged display screen 14gZ of the enlargement operation region Z1;

FIG. 12 is a view showing a specific example of a touch region image GT extracted from a touch operation region 16Tn on the presentation screen 14g in accordance with the keyword extraction process of the keyword extractor 10;

FIG. 13 is a view showing a specific example of an enlarged region image GZ extracted from an enlargement operation region 16Zn on the presentation screen 14g in accordance with the keyword extraction process of the keyword extractor 10;

FIG. 14 is a view showing specific examples of respective keywords extracted from the respective operation regions on the presentation screen 14g and registered in the keyword data storage unit 19 in accordance with the keyword extraction process of the keyword extractor 10;

DETAILED DESCRIPTION OF EXEMPLARY EMBODIMENTS

Exemplary embodiments of the present invention will be described below with reference to the drawings.

Figure 1:
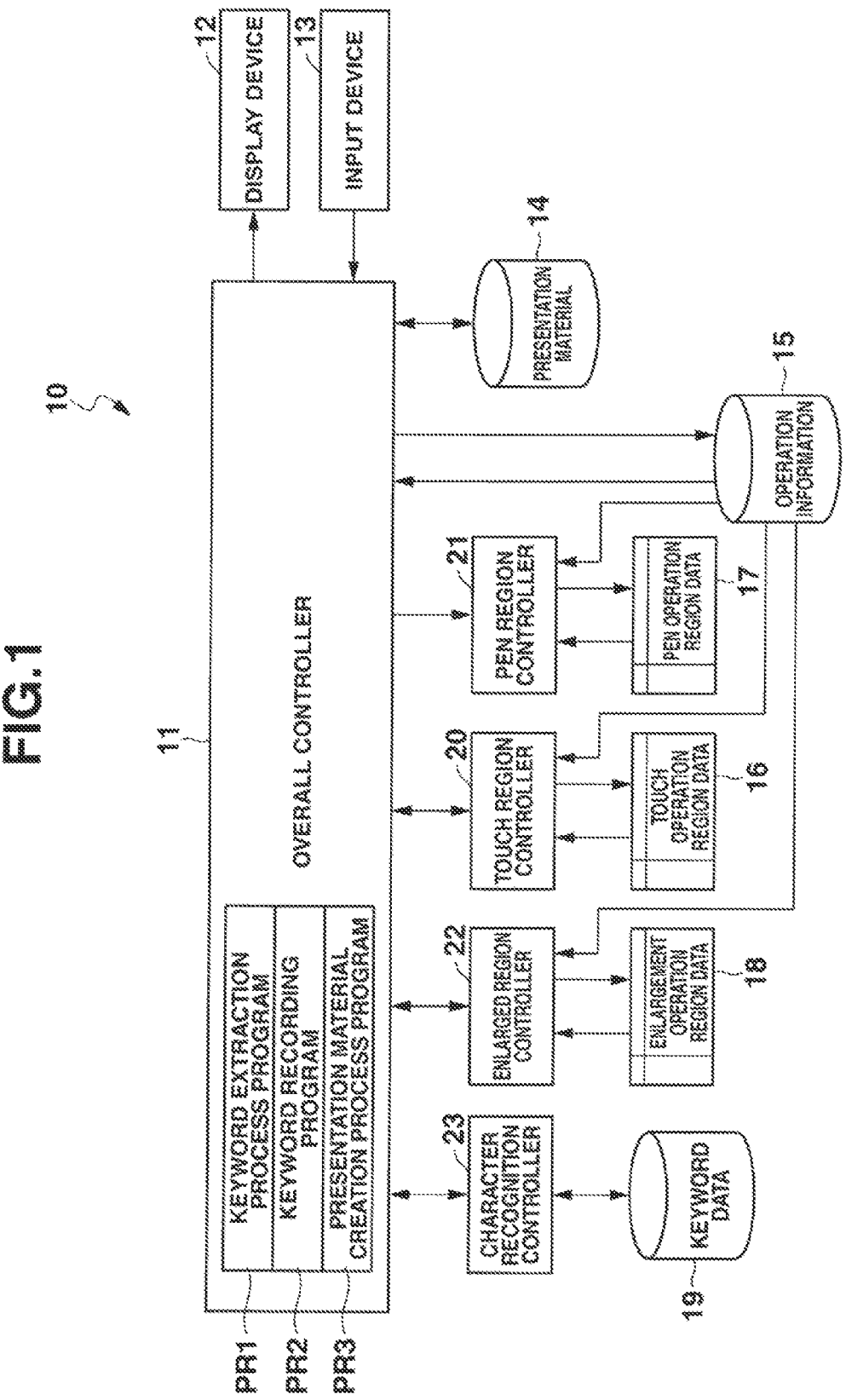
FIG. 1 is a functional block diagram showing the configuration of a keyword extractor 10 according to an embodiment of an information processing apparatus according to the invention.

FIG. 1 is a functional block diagram showing the configuration of a keyword extractor 10 according to an embodiment of an information processing apparatus according to the invention.

The keyword extractor 10 is implemented by an information instrument such as a tablet-type PDA or PC which will be described later, a projector system which can detect a position designated on a screen by a user, etc.

The keyword extractor 10 according to the embodiment is constituted by a tablet-type PDA. The keyword extractor 10 is provided with an overall controller 11, a touch region controller 20, a pen region controller 21, an enlarged region controller 22, and a character recognition controller 23, which consist of a computer (CPU).

These respective controllers 11, 20, 21, 22 and 23 control operations of respective units in accordance with an apparatus control program PR stored in a not-shown memory such as a hard disk or an ROM. The apparatus control program PR is started up in accordance with an input signal from an input device 13 of a transparent touch panel, which is, for example, provided on top of a screen of a backlighted color liquid crystal display device 12.

The input device 13 is a double-layered touch panel in which an electromagnetic induction type touch panel as a first touch panel and an electrostatic capacitance type touch panel as a second touch panel are provided on a display screen of the display device 12.

The electromagnetic induction type touch panel detects an operation performed by a special pen generating a magnetic field on the display screen of the display device 12 based on an electromagnetic induction system.

The electrostatic capacitance type touch panel detects an operation performed by a finger on the display screen of the display device 12 based on an electrostatic capacitance system.

A keyword extraction process program PR1 for extracting a keyword from a region designated in accordance with a touch operation performed by a finger, a touch operation performed by a pen or an enlargement touch operation on a presentation screen (image) displayed on the display device 12, a keyword recording program PR2 for editing and recording the extracted keyword on a predetermined keyword recording form Fk, a presentation material creation process program PR3 for creating new presentation materials based on the recorded keyword, etc. are stored as the apparatus control program PR in addition to the system program for controlling the whole of the apparatus.

The keyword extractor 10 is provided with a presentation material storage unit 14, an operation information storage unit 15, a touch operation region data storage unit 16, a pen operation region data storage unit 17, an enlarged operation region data storage unit 18 and a keyword data storage unit 19, whose storage regions are allocated in a not-shown memory such as a hard disk or an RAM.

A presentation material screen (presentation screen) 14g which is created in advance or which is created in accordance with the presentation material creation process program PR3 is stored in the presentation material storage unit 14.

Figure 2:
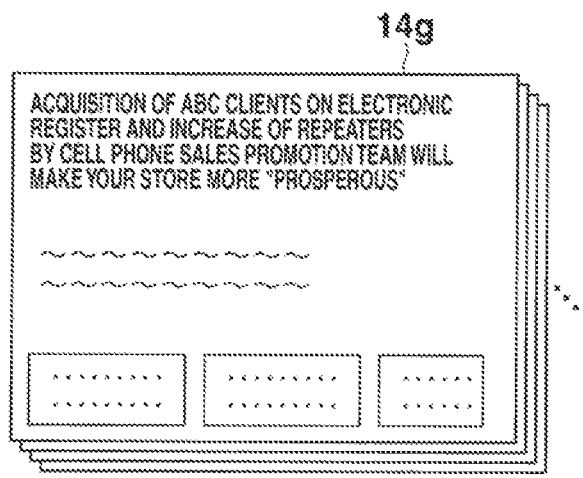
FIG. 2 is a view showing an example of a presentation screen 14g stored in a presentation material storage unit 14 of the keyword extractor 10.

FIG. 2 is a view showing an example of the presentation screen 14g stored in the presentation material storage unit 14 of the keyword extractor 10.

Information about a position or a region on the presentation screen 14g in accordance with a touch operation performed by a user in the input device (touch panel) 13 is stored in the operation information storage unit 15 in accordance with the control of the overall controller 11.

Figure 3:
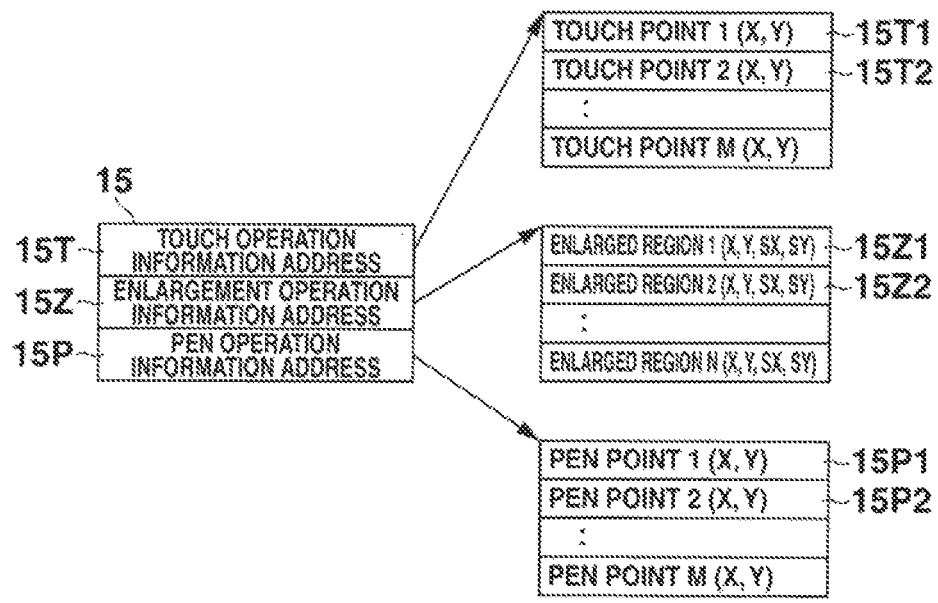
FIG. 3 is a view showing user operation information stored in an operation information storage unit 15 of the keyword extractor 10.

FIG. 3 is a view showing user operation information stored in the operation information storage unit 15 of the keyword extractor 10.

A touch operation information address 15T, an enlargement operation information address 15Z and a pen operation information address 15P are allocated in the operation information storage unit 15.

Coordinates (X, Y) 15T1, 15T2 or the like of touch positions 1, 2 or the like designated by touch operation on the presentation screen 14g with a finger by the user are stored in the touch operation information address 15T. In addition, coordinates (X, Y, SX, SY) 15Z1, 15Z2 or the like of enlarged regions 1, 2 or the like enlarged by multitouch-operation on the same presentation screen 14g with fingers by the user are stored in the enlargement operation information address 15Z. In addition, coordinates (X, Y) 15P1, 15P2 or the like of pen touch positions 1, 2 or the like designated by touch operation on the same presentation screen 14g with a pen by the user are stored in the pen operation information address 15P.

In the input device (touch panel) 13, a touch operation performed by a finger is detected by the electrostatic capacitance type touch panel and a touch operation performed by a pen is detected by the electromagnetic induction type touch panel.

Incidentally, when the input device (touch panel) 13 consists of one layer of the electrostatic capacitance type touch panel, detection of a touch operation performed by a finger or detection of a touch operation performed by a pen may be determined based on whether the center (X, Y) of the touch position is detected with a spread not smaller than a threshold or not (or detected as a pin point or not).

Figure 4:
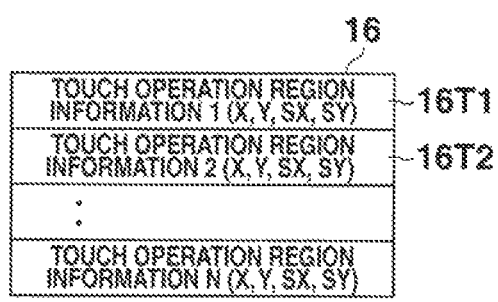
FIG. 4 is a view showing touch operation region data stored in a touch operation region data storage unit 16 of the keyword extractor 10.

FIG. 4 is a view showing touch operation region data stored in the touch operation region data storage unit 16 of the keyword extractor 10.

Coordinates (X, Y, SX, SY) 16T1, 16T2 or the like indicating regions 1, 2 or the like of rectangular sizes set in advance correspondingly to the coordinates (X, Y) 15T1, 15T2 or the like of the positions 1, 2 or the like designated by the touch operation with the finger by the user in accordance with the control of the overall controller 11 and the touch region controller 20 are stored in the touch operation region data storage unit 16.

Coordinates (X, Y, SX, SY) indicating regions 1, 2 or the like of rectangular sizes set in advance correspondingly to the coordinates (X, Y) 15P1, 15P2, . . . of the positions 1, 2 or the like designated by the touch operation with the pen by the user in accordance with the control of the overall controller 11 and the pen region controller 21 are stored in the pen operation region data storage unit 17 in the same manner as the touch operation region data (16).

The coordinates (X, Y, SX, SY) 15Z1, 15Z2 or the like of the enlarged regions 1, 2 or the like enlarged by the multitouch operation of the user in accordance with the control of the overall controller 11 and the enlarged region controller 22 are transferred to and stored in the enlargement operation region data storage unit 18 as they are with the same contents as those stored in the enlargement operation information address 15Z (see FIG. 3).

Characters in an image extracted from the presentation screen 14g in accordance with the coordinates (X, Y, SX, SY) 16T1, 16T2 or the like of the touch operation regions 1, 2 or the like stored in the touch operation region data storage unit 16, or the coordinates (X, Y, SX, SY) of the pen touch operation regions 1, 2 or the like stored in the pen operation region data storage unit 17, or the coordinates (X, Y, SX, SY) 15Z1, 15Z2 or the like of the enlarged regions 1, 2 or the like stored in the enlargement operation region data storage unit 18 are recognized in accordance with the control of the character recognition controller 23. A character string consisting of the recognized characters is stored as a keyword in the keyword data storage unit 19.

On this occasion, assume that a user using his/her finger or fingers to perform a touch operation or an enlargement operation on the presentation screen 14g displayed on the display device 12 is regarded as a presenting side user (for example, a "salesclerk") and a user using the pen to perform a touch operation on the same presentation screen 14g is regarded as a presented side user (for example, a "client") in the embodiment.

Figure 5:
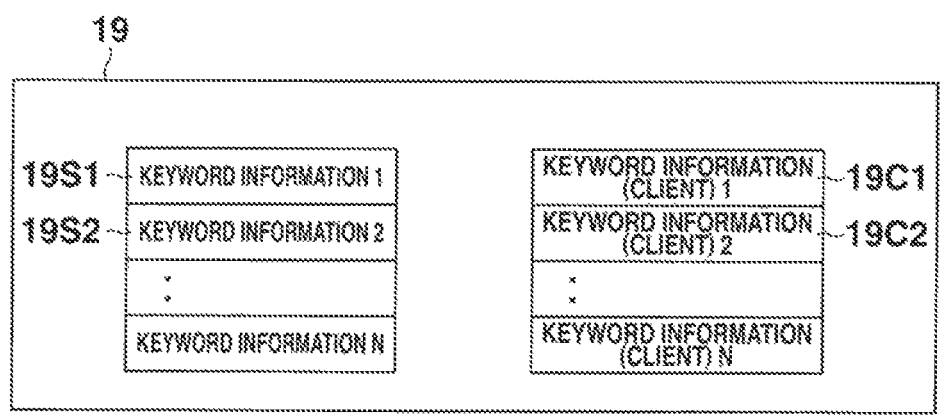
FIG. 5 is a view showing keyword data stored in a keyword data storage unit 19 of the keyword extractor 10.

Therefore, for example, as shown in FIG. 5, character recognition results of images extracted from the presentation screen 14g in accordance with the coordinates (X, Y, SX, SY) 16T1, 16T2 or the like of the touch operation regions 1, 2 or the like performed by the finger and character recognition results of images extracted from the presentation screen 14g in accordance with the coordinates (X, Y, SX, SY) 15Z1, 15Z2 or the like of the enlarged regions 1, 2 or the like, are stored as presenting side (salesclerk) keywords 19S1, 19S2 or the like in the keyword data storage unit 19. In addition, character recognition results of images extracted from the presentation screen 14g in accordance with the coordinates (X, Y, SX, SY) of the touch operation regions 1, 2 or the like performed by the pen is stored as presented side (client) keywords 19C1, 19C2 or the like in the keyword data storage unit 19.

FIG. 5 is a view showing keyword data stored in the keyword data storage unit 19 of the keyword extractor 10.

The respective controllers (CPU) 11, 20, 21, 22 and 23 control operations of respective units in accordance with commands described in the respective programs PR1, PR2 and PR3 so that software and hardware can operate in cooperation with each other. In this manner, the keyword extractor 10 configured thus implements functions which will be described in the following operation description.

Next, operation of the keyword extractor 10 having the aforementioned configuration will be described.

(Keyword Extraction Function)

Figure 6:
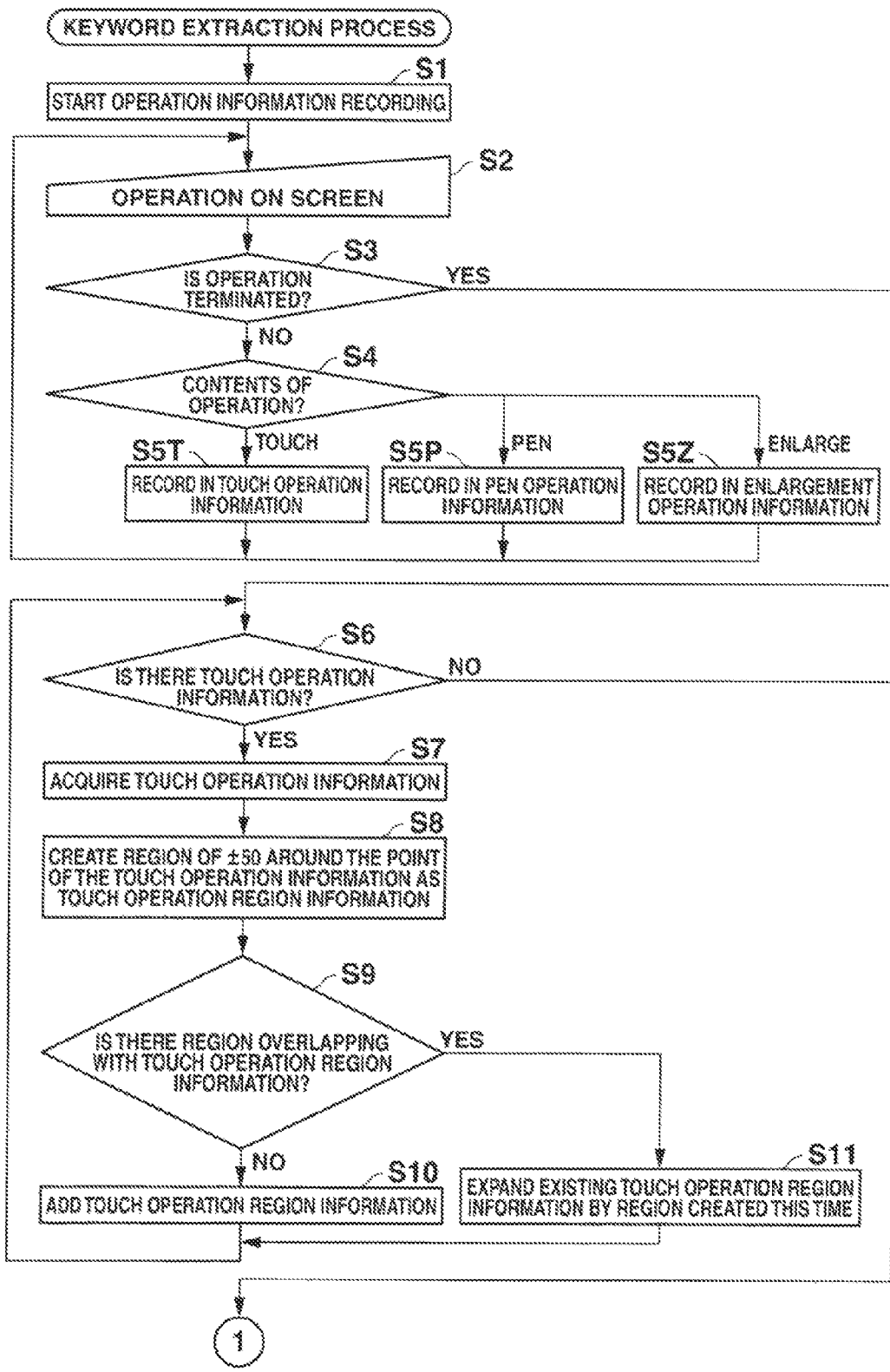
FIG. 6 is a flow chart showing a keyword extraction process (first part) executed in accordance with a keyword extraction process program PR1 of the keyword extractor 10.

FIG. 6 is a flow chart showing a keyword extraction process (first part) executed in accordance with the keyword extraction process program PR1 of the keyword extractor 10.

Figure 7:
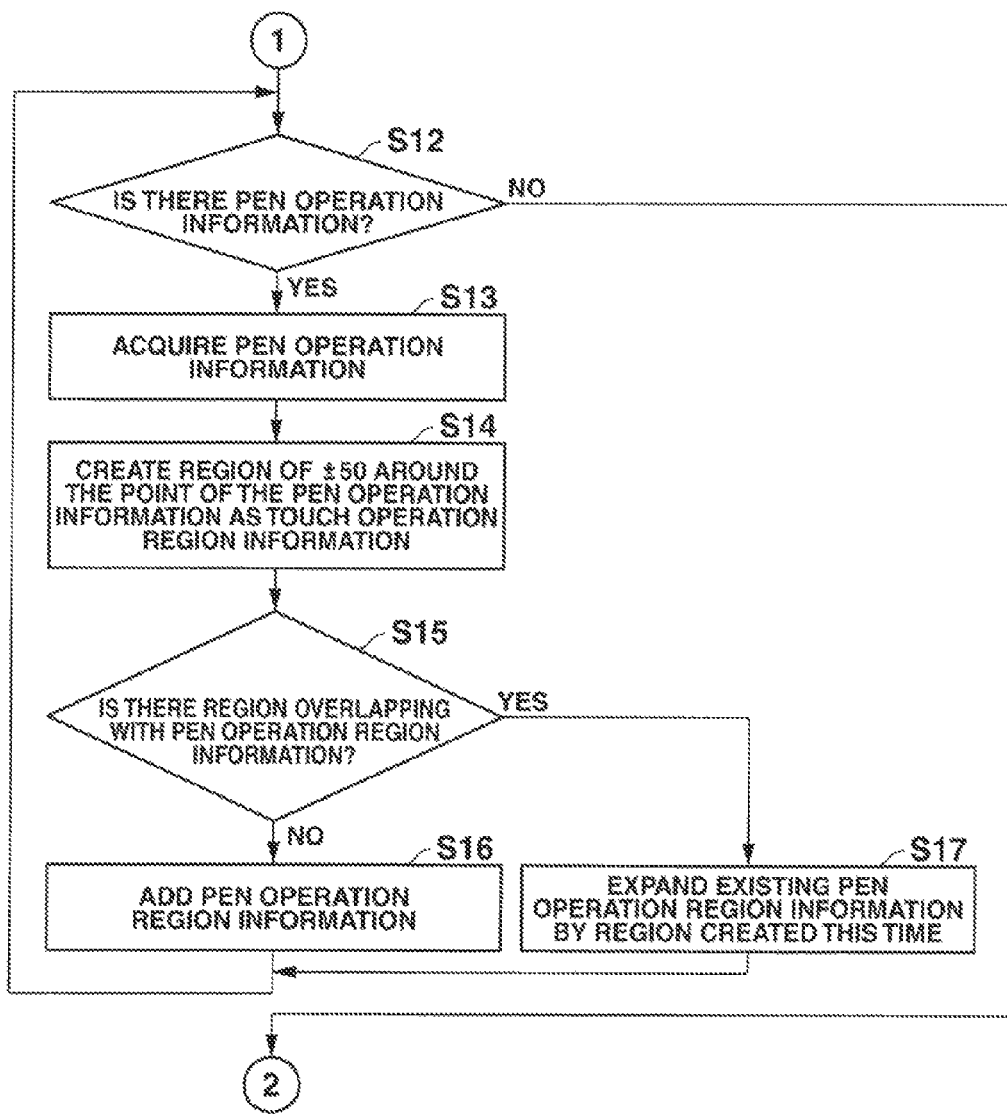
FIG. 7 is a flow chart showing the keyword extraction process (second part) executed in accordance with the keyword extraction process program PR1 of the keyword extractor 10.

FIG. 7 is a flow chart showing the keyword extraction process (second part) executed in accordance with the keyword extraction process program PR1 of the keyword extractor 10.

Figure 8:
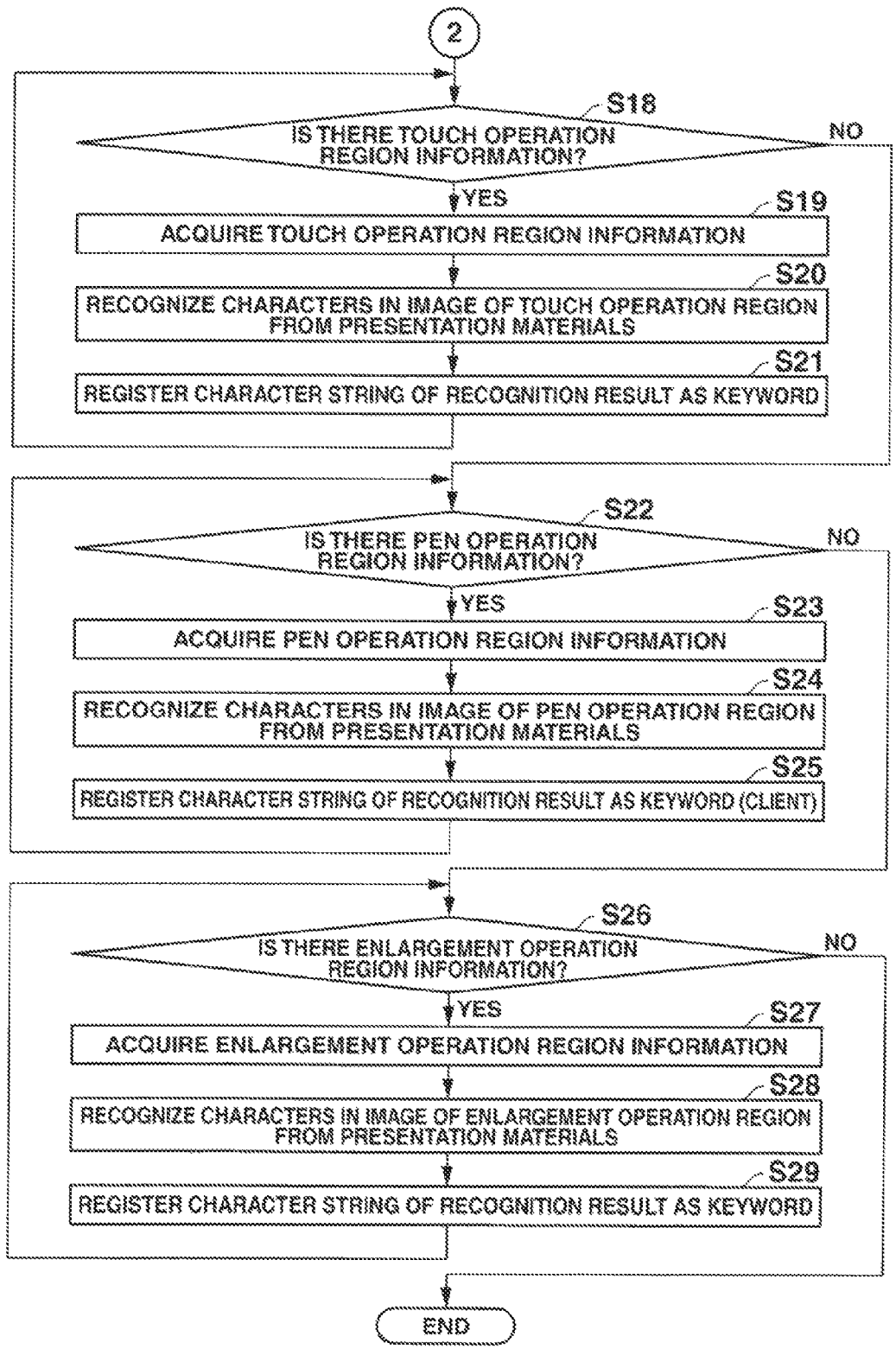
FIG. 8 is a flow chart showing the keyword extraction process (third part) executed in accordance with the keyword extraction process program PR1 of the keyword extractor 10.

FIG. 8 is a flow chart showing the keyword extraction process (third part) executed in accordance with the keyword extraction process program PR1 of the keyword extractor 10.

For example, in a presentation operation mode set in response to a touch operation performed on the input device (touch panel) 13 by the presenting side user, an operation information recording (keyword extraction process) is started (Step S1).

When a desired presentation screen 14g stored in the presentation material storage unit 14 is selected in accordance with an operation of the user, the selected presentation screen 14g is displayed on the display device 12 (Step S2).

When the user performs a touch operation on the input device 13 in the presentation screen 14g displayed on the display device 12, it may be determined that the operation is a touch operation performed with a finger (Step S4 (touch)). In this case, coordinates (X, Y) 15T1, 15T2 or the like of the position the finger touches are recorded in the touch operation information address 15T of the operation information storage unit 15 every time the touch operation is determined (Step S5T).

Further, it may be determined that the operation is a touch operation performed with a pen (Step 4 (pen)). In this case, coordinates (X, Y) 15P1, 15P2 or the like of the position the pen touches are recorded in the pen operation information address 15P of the operation information storage unit 15 every time the touch operation is determined (Step S5P).

On the other hand, it may be determined that the operation is an enlargement operation performed by multi-touch (Step S4 (enlarge)). In this case, coordinates (X, Y, SX, SY) 15Z1, 15Z2 or the like of a region subjected to the enlargement operation are recorded in the enlargement operation information address 15Z of the operation information storage unit 15 every time the enlargement operation is determined (Step S5Z).

In this manner, in accordance with the touch operations using the input device (touch panel) 13 on the presentation screen 14g displayed on the display device 12, the coordinates (X, Y) 15T1, 15T2 or the like designated by the touch operation with the finger on the presenting side and the coordinates (X, Y, SX, ZY) 15Z1, 15Z2 or the like of the region subjected to the enlargement operation are recorded in the touch operation information address 15T and the enlargement operation information address 15Z of the operation information storage unit 15 respectively, and the coordinates (X, Y) 15P1, 15P2 or the like designated by the touch operation with a pen on the presented side are recorded in the pen operation information address 15P of the same operation information storage unit 15.

When it is then determined that an operation to terminate the presentation has been performed ("Yes" in Step S3), it is determined whether the touch operation information of the finger has been recorded in the touch operation information address 15T of the operation information storage unit 15 or not (Step S6).

Here, when it is determined that the touch operation information of the finger has been recorded in the touch operation information address 15T of the operation information storage unit 15 ("Yes" in Step S6), the coordinates (X, Y) 15T1, 15T2 or the like which are the touch operation information of the finger are acquired (Step S7).

A region surrounded by a rectangular size of ±50 dots in both an X direction and a Y direction with respect to the coordinates (X, Y) 15T1, 15T2 or the like acquired from the touch operation information address 15T in accordance with the coordinates (X, Y) is created as coordinates (X, Y, SX, SY) 16T1, 16T2 or the like indicating a touch operation region 1, 2 or the like and stored in the touch operation region data storage unit 16 (Steps S8 to S11).

On this occasion, it is determined whether a touch operation region (16Tm) located on the same presentation screen 14g and already stored in the touch operation region data storage unit 16 has an overlapping region or not with a touch operation region (16Tn) created this time (Step S9).

When it is determined that the touch operation region (16Tm) has no overlapping region ("No" in Step S9), the coordinates (X, Y, SX, SY) 16Tn of the touch operation region 1, 2 or the like created this time are additionally stored in the touch operation region data storage unit 16 (Step S10).

On the other hand, when it is determined that the touch operation region (16Tm) has an overlapping region ("Yes" in Step S9), coordinates (16Tm+Tn) of an expanded region obtained by adding the touch operation region (16Tn) created this time to the touch operation region (16Tm) which has been already stored and which is determined to have the overlapping region are stored for update in the touch operation region data storage unit 16 (Step S11).

When it is determined that next touch operation information (15Tn) has been recorded in the touch operation information address 15T of the operation information storage unit 15, the same process of creating and storing touch operation region information (16Tn) is repeated (Steps S6 to S11).

Then, it is determined whether touch operation information of the pen has been recorded in the pen operation information address 15P of the operation information storage unit 15 or not (Step S12).

Here, when it is determined that the touch operation information of the pen has been recorded in the pen operation information address 15P of the operation information storage unit 15 ("Yes" in Step S12), coordinates (X, Y) 15P1, 15P2 or the like which are the touch operation information of the pen are acquired (Step S13).

A region surrounded by a rectangular size of ±50 dots in both the X direction and the Y direction with respect to the coordinates (X, Y) 15P1, 15P2 or the like acquired from the pen operation information address 15P in accordance with the coordinates (X, Y) are created as coordinates (X, Y, SX, SY) indicating the pen operation region 1, 2 or the like and stored in the pen operation region data storage unit 17 (Step S14).

On this occasion, it is determined whether a pen operation region located on the same presentation screen 14g and already stored in the pen operation region data storage unit 17 has an overlapping region or not with the pen operation region created this time (Step S15).

When it is determined that the pen operation region has no overlapping region ("No" in Step S15), the coordinates (X, Y, SX, SY) of the pen operation region 1, 2 or the like created this time are additionally stored in the pen operation region data storage unit 17 (Step S16).

On the other hand, when it is determined that the pen operation region has an overlapping region ("Yes" in Step S15), coordinates of an expanded region obtained by adding the pen operation region created this time to the pen operation region which is determined to have the overlapping region and which has already been stored are stored for update in the pen operation region data storage unit 17 (Step S17).

When it is determined that next pen operation information has been recorded in the pen operation information address 15P of the operation information storage unit 15, the same process of creating and storing pen operation region information is repeated (Step S12 to S17).

Next, it is determined whether touch operation region information have been stored in the touch operation region data storage unit 16 or not (Step S18).

Here, when it is determined that touch operation region information have been recorded in the touch operation region data storage unit 16 ("Yes" in Step S18), the coordinates (X, Y, SX, SY) 16T1, 16T2 or the like which are the touch operation region information are acquired (Step S19).

Then, in accordance with the coordinates (X, Y, SX, SY) 16T1, 16T2 or the like of each of the touch operation regions acquired thus, characters are recognized in an image extracted from the presentation screen 14g correspondingly to the coordinates (X, Y, SX, SY) of the region by the character recognition controller 23 (Step S20).

Strings of characters recognized thus are registered as presenting side keywords 19S1, 19S2 or the like in the keyword data storage unit 19 (see FIG. 5) (Step S21).

Next, it is determined whether pen operation region information have been stored in the pen operation region data storage unit 17 or not (Step S22).

Here, when it is determined that the pen operation region information have been recorded in the pen operation region data storage unit 17 (Yes in Step S22), coordinates (X, Y, SX, SY) or the like which are the pen operation region information are acquired (Step S23).

Then, in accordance with the coordinates (X, Y, SX, SY) or the like of each of the pen operation regions acquired thus, characters are recognized in an image extracted from the presentation screen 14g correspondingly to the coordinates (X, Y, SX, SY) of the region by the character recognition controller 23 (Step S24).

Strings of characters recognized thus are registered as presented side (client) keywords 19C1, 19C2 or the like in the keyword data storage unit 19 (see FIG. 5) (Step S25).

Then, it is determined whether enlargement operation region information have been stored in the enlargement operation region data storage unit 18 or not (Step S26).

Here, when it is determined that the enlargement operation region information have been recorded in the enlargement operation region data storage unit 18 (Yes in Step S26), coordinates (X, Y, SX, SY) or the like which are the enlargement operation region information are acquired (Step S27).

Then, in accordance with the coordinates (X, Y, SX, SY) or the like of each of the enlargement operation regions acquired thus, characters are recognized in an image extracted from the presentation screen 14g correspondingly to the coordinates (X, Y, SX, SY) of the region by the character recognition controller 23 (Step S28).

Strings of characters recognized thus are registered as presenting side keywords 19S1, 19S2 or the like in the keyword data storage unit 19 (see FIG. 5) (Step 29).

<An Example of Keyword Extraction Function>

Figure 9A:
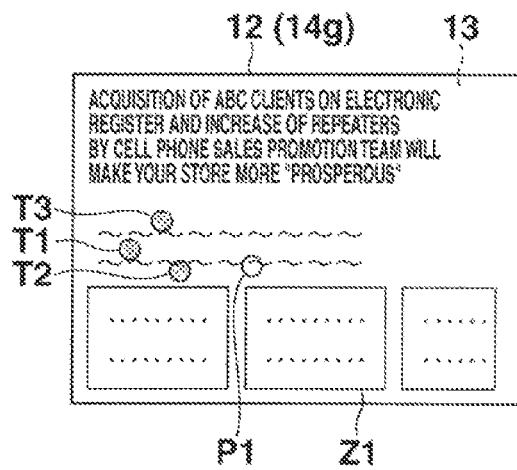
Figure 9B:
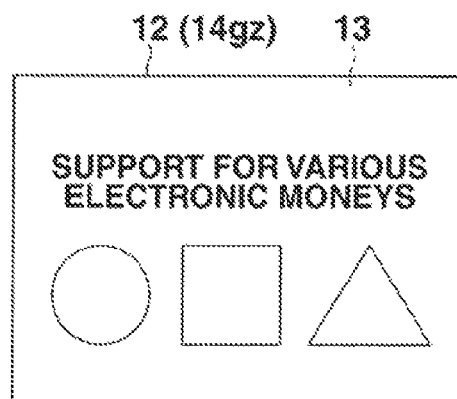

FIGS. 9A and 9B are views showing a specific display operation on the presentation screen 14g in accordance with a keyword extraction process of the keyword extractor 10. FIG. 9A is a view showing touch operation positions T1 to T3 touched by a finger, a touch operation position P1 touched by a pen and an enlargement operation region Z1 on the presentation screen 14g displayed on the display device 12. FIG. 9B is a view showing an enlarged display screen 14gZ of the enlargement operation region Z1.

Figure 10:
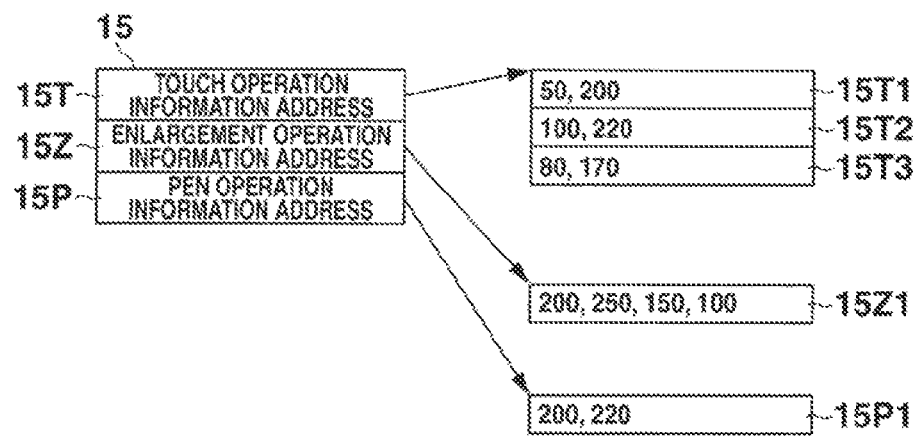
FIG. 10 is a view showing a specific example in which touch operation information are obtained on the presentation screen 14g in FIGS. 9A and 9B in accordance with the keyword extraction process of the keyword extractor 10.

FIG. 10 is a view showing a specific example in which touch operation information are obtained on the presentation screen 14g in FIGS. 9A and 9B in accordance with the keyword extraction process of the keyword extractor 10.

Figure 11:
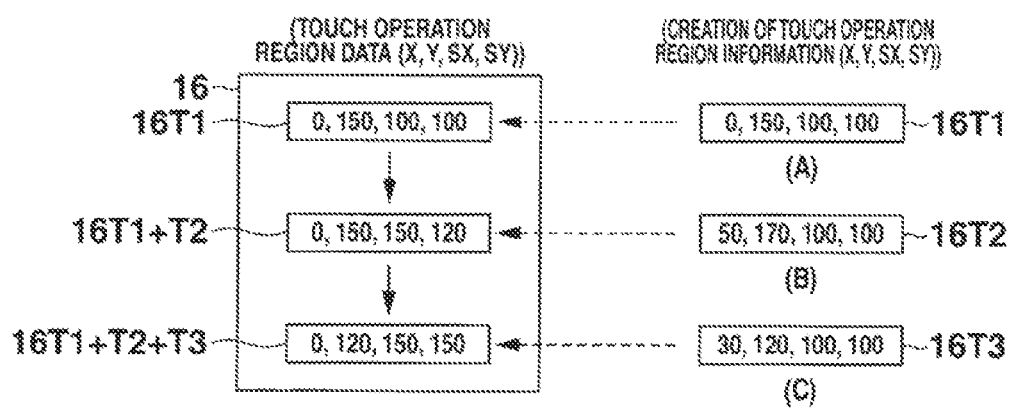
FIG. 11 is a view showing a specific example in which touch operation region information are created correspondingly to the touch operation information in FIG. 10 respectively in accordance with the keyword extraction process of the keyword extractor 10 while expanded region information is created when the regions of the touch operation region information overlap with each other.

FIG. 11 is a view showing a specific example in which touch operation region information are created correspondingly to the touch operation information in FIG. 10 respectively in accordance with the keyword extraction process of the keyword extractor 10 while expanded region information is created when the regions of the touch operation region information overlap with each other.

When, for example, the presenting side touches three desired points T1 to T3 with a finger on the presentation screen 14g displayed on the display device 12 as shown in FIG. 9A (Steps S1 and S2), XY coordinates (X=50, Y=200) 15T1 corresponding to the touch operation position T1, XY coordinates (X=100, Y=220) 15T2 corresponding to the touch operation position T2 and XY coordinates (X=80, Y=170) 15T3 corresponding to the touch operation position T3 are recorded in the touch operation information address 15T of the operation information storage unit 15 as shown in FIG. 10 (Steps S4 and S5T).

In addition, when, for example, the presenting side touches a region Z1 to be enlarged, coordinates (X=200, Y=250, SX=150, SY=100) 15Z1 corresponding to the upper left of the enlargement operation region Z1 and a range extending therefrom in the X direction and the Y direction are recorded in the enlargement operation information address 15Z of the operation information storage unit 15 as shown in FIG. 10 (Steps S4 and S5Z).

Further, when, for example, the presented side (client) touches one desired point P1 with the pen, XY coordinates (X=200, Y=220) 15P1 corresponding to the pen operation position P1 are recorded in the pen operation information address 15P of the operation information storage unit 15 as shown in FIG. 10 (Steps S4 and S5P).

When an operation to terminate the presentation is performed (Yes in Step S3), the coordinates (X=50, Y=200) 15T1 corresponding to the first touch operation position T1 are first acquired from the touch operation information address 15T of the operation information storage unit 15 so that coordinates (X=0, Y=150, SX=100, SY=100) 16T1 of a touch operation region surrounded by a rectangular size of ±50 dots in both the X direction and the Y direction are created as shown in (A) of FIG. 11 (Steps S6 to T8).

In this case, there is no other touch operation region overlapping with the first touch operation region (X=0, Y=150, SX=100, SY=100) 16T1. Accordingly, the touch operation region 16T1 is stored in the touch operation region data storage unit 16 as it is (Steps S9 and S10).

Then, the coordinates (X=100, Y=220) 15T2 corresponding to the second touch operation position T2 are acquired from the touch operation information address 15T of the operation information storage unit 15 so that coordinates (X=50, Y=170, SX=100, SY=100) 16T2 of a touch operation region surrounded by a rectangular size of ±50 dots in both the X direction and the Y direction are created as shown in (B) of FIG. 11 (Steps S6 to S8).

In this case, a region overlapping with the second touch operation region (X=50, Y=170, SX=100, SY=100) 16T2 created this time corresponds to the first touch operation region (X=0, Y=150, SX=100, SY=100) 16T1 which has been already stored in the touch operation region data storage unit 16. Accordingly, coordinates (0, 150, 150, 120) 16T1+T2 of an expanded touch operation region obtained by adding the second touch operation region 16T2 to the existing and overlapping touch operation region 16T1 are stored for update in the touch operation region data storage unit 16 (Step S11).

Then, the coordinates (X=80, Y=170) 15T3 corresponding to the third touch operation position T3 are acquired from the touch operation information address 15T of the operation information storage unit 15 so that coordinates (X=30, Y=120, SX=100, SY=100) 16T3 of a touch operation region surrounded by a rectangular size of ±50 dots in both the X direction and the Y direction are created as shown in (C) of FIG. 11 (Steps S6 to S8).

In this case, a region overlapping with the third touch operation region (X=30, Y=120, SX=100, SY=100) 16T3 created this time corresponds to the expanded touch operation region (0, 150, 150, 120) 16T1+T2 which has been already stored in the touch operation region data storage unit 16. Accordingly, coordinates (0, 120, 150, 150) 16T1+T2+T3 of an expanded touch operation region obtained by adding the third touch operation region 16T3 to the existing and overlapping touch operation region 16T1+T2 are stored for update in the touch operation region data storage unit 16 (Step S11).

Also as for the coordinates (200, 220) 15P1 (see FIG. 10) corresponding to the pen operation position P1 which has been stored in the pen operation information address 15P of the operation information storage unit 15, a pen operation region corresponding to the pen operation position P1 is created in the same manner as in the process of creating and storing the touch operation region 16Tn corresponding to the touch operation position 15Tn, and stored in the pen operation region data storage unit 17 (Steps S12 to S17).

FIG. 12 is a view showing a specific example of a touch region image GT extracted from a touch operation region 16Tn on the presentation screen 14g in accordance with the keyword extraction process of the keyword extractor 10.

FIG. 13 is a view showing a specific example of an enlarged region image GZ extracted from an enlarged operation region 16Zn on the presentation screen 14g in accordance with the keyword extraction process of the keyword extractor 10.

FIG. 14 is a view showing specific examples of respective keywords extracted from respective operation regions on the presentation screen 14g in accordance with the keyword extraction process of the keyword extractor 10 and registered in the keyword data storage unit 19.

When the coordinates (0, 120, 150, 150) 16T1+T2+T3 of the touch operation region stored in the touch operation region data storage unit 16 are acquired as shown in FIG. 11 (Steps S18 and S19), a touch region image GT corresponding to the touch operation region 16T1+T2+T3 is extracted from the presentation image 14g (see FIG. 9A) as shown in FIG. 12 so that characters can be recognized in the touch region image GT by the character recognition controller 23 (Step S20).

Then, a character string "acquisition of more clients at ABC•DEF" consisting of the characters recognized thus from the touch region image GT is registered as a presenting side (T) keyword 19S1 in the keyword data storage unit 19 as shown in FIG. 14 (Step S21).

When a pen operation region which has been stored in the pen operation region data storage unit 17 is acquired (Steps S22 and S23), a pen region image corresponding to the pen operation region is extracted from the presentation image 14g so that characters can be recognized in the pen region image by the character recognition controller 23 (Step S24).

Then, a character string consisting of the characters recognized thus from the pen region image is registered as a presented side (client) (P) keyword 19C1 in the keyword data storage unit 19 (Step S25).

When coordinates (200, 250, 150, 100) 15Z1 of an enlargement operation region which has been stored in the enlargement operation region data storage unit 18 are acquired (Steps S26 and S27), an enlarged region image GZ corresponding to the enlargement operation region 15Z1 is extracted from the presentation image 14g (see FIGS. 9A and 9B) as shown in FIG. 13 so that characters can be recognized in the enlarged region image GZ by the character recognition controller 23 (Step S28).

Then, a character string "support for various electronic moneys" consisting of the characters recognized thus from the enlarged region image GZ is registered as a presenting side (Z) keyword 19S2 in the keyword data storage unit 19 as shown in FIG. 14 (Step S29).

<Keyword Recording Function>

Figure 15:
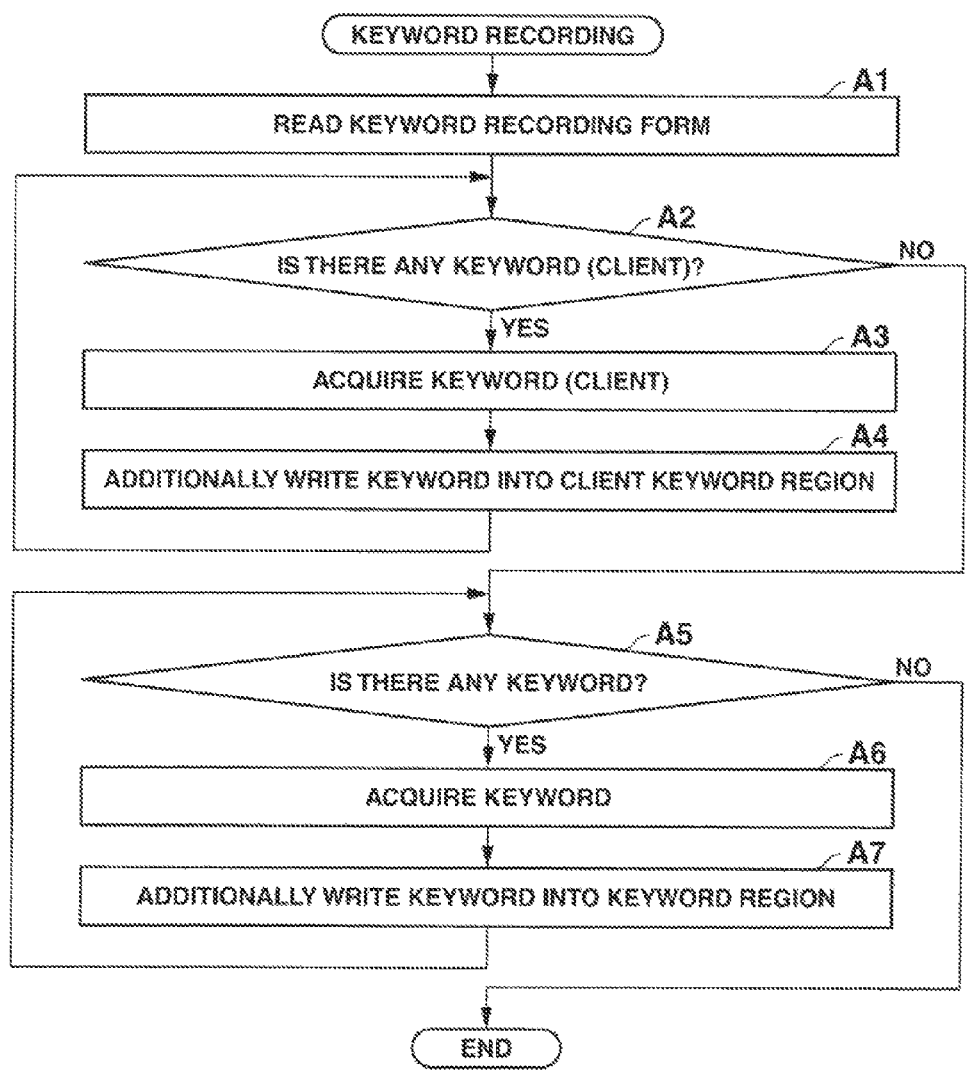
FIG. 15 is a flow chart showing a keyword recording for editing and recording the keywords registered in the keyword data storage unit 19 by the keyword extraction process of the keyword extractor 10.

FIG. 15 is a flow chart showing a keyword recording for editing and recording keywords which have been registered in the keyword data storage unit 19 by the keyword extraction process of the keyword extractor 10.

Figure 16:
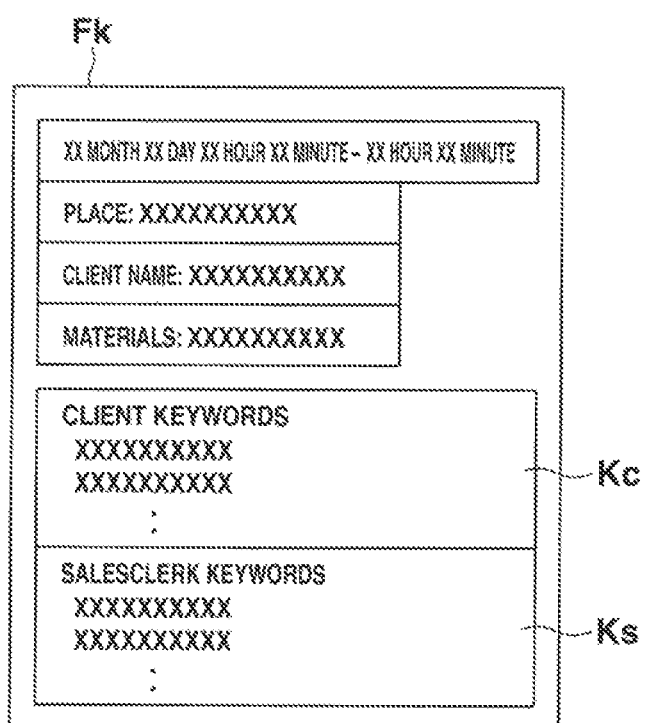
FIG. 16 is a view showing a keyword recording form Fk used in the keyword recording of the keyword extractor 10.

FIG. 16 is a view showing a keyword recording form Fk used in the keyword recording of the keyword extractor 10.

When a keyword corresponding to each operation region of the user (the presenting side (salesclerk)/the presented side (client)) on the presentation screen 14g is extracted and registered in the keyword data storage unit 19 in accordance with the keyword extraction process (see FIGS. 6 to 14), the keyword recording in FIG. 15 is executed.

When the keyword recording is started up, the keyword recording form Fk (see FIG. 16) corresponding to the presentation this time and stored in the keyword data storage unit 19 is read (Step A1) so that it can be determined whether presented side (client) keywords (P) have been registered in the same keyword data storage unit 19 (see FIG. 14) or not (Step A2).

Here, when it is determined that presented side (client) keywords (P) 19C1 to 19Cn have been registered (Yes in Step A2), the keywords (P) 19C1 to 19Cn are acquired sequentially (Step A3) and added and recorded sequentially in a client keyword region Kc in the keyword recording form Fk (Step A4).

When it is determined that there is no presented side (client) keyword (P) which should be acquired from the keyword data storage unit 19 ("No" in Step A2), it is then determined whether presenting side (salesclerk) keywords (T) and (Z) have been registered in the same keyword data storage unit 19 (see FIG. 14) or not (Step A5).

Here, when it is determined that presenting side (salesclerk) keywords (T) 19S1 and (Z) 19S2 have been registered ("Yes" in Step A5), the keywords (T) 19S1 and (Z) 19S2 are acquired sequentially (Step S6) and added and recorded sequentially in a salesclerk keyword region Ks in the keyword recording form Fk (Step A7).

When it is determined that there is no presenting side (salesclerk) keyword (T) or (Z) which should be acquired from the keyword data storage unit 19 ("No" in Step A5), the keyword recording form Fk in which the presented side (client) keyword (P) 19C1 is classified and recorded into the client keyword region Kc and the presenting side (salesclerk) keywords (T) 19S1 and (Z) 19S2 are classified and recorded into the salesclerk keyword region Ks is registered in the keyword data storage unit 19.

<Presentation Material Creation Function>

Figure 17:
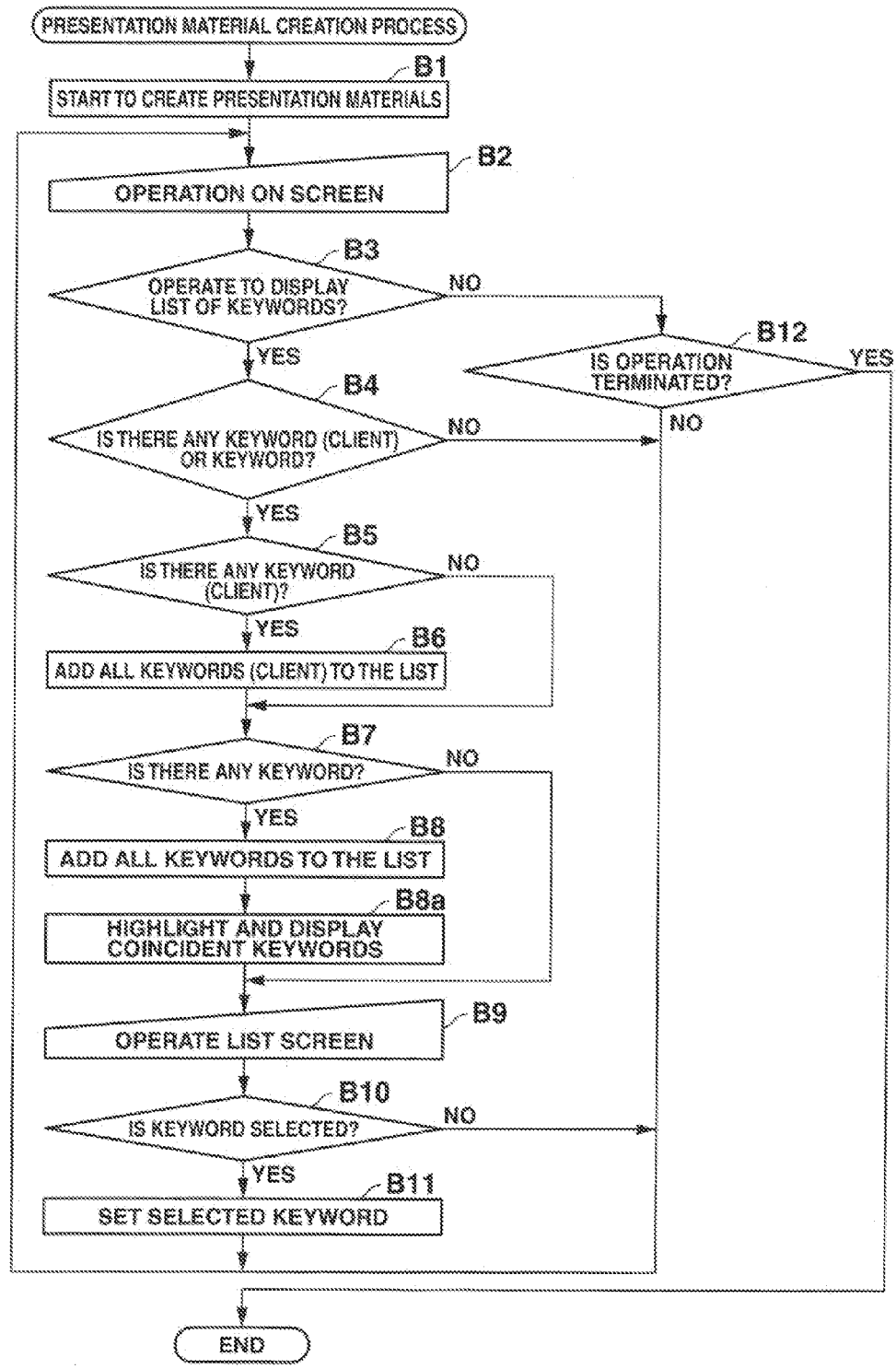
FIG. 17 is a flow chart showing a presentation material creation process for creating new presentation materials based on the keyword recording form Fk recorded by the keyword recording of the keyword extractor 10.

FIG. 17 is a flow chart showing a presentation material creation process for creating a new presentation material based on a keyword recording form Fk which has been recorded by the keyword recording of the keyword extractor 10.

Figure 18:
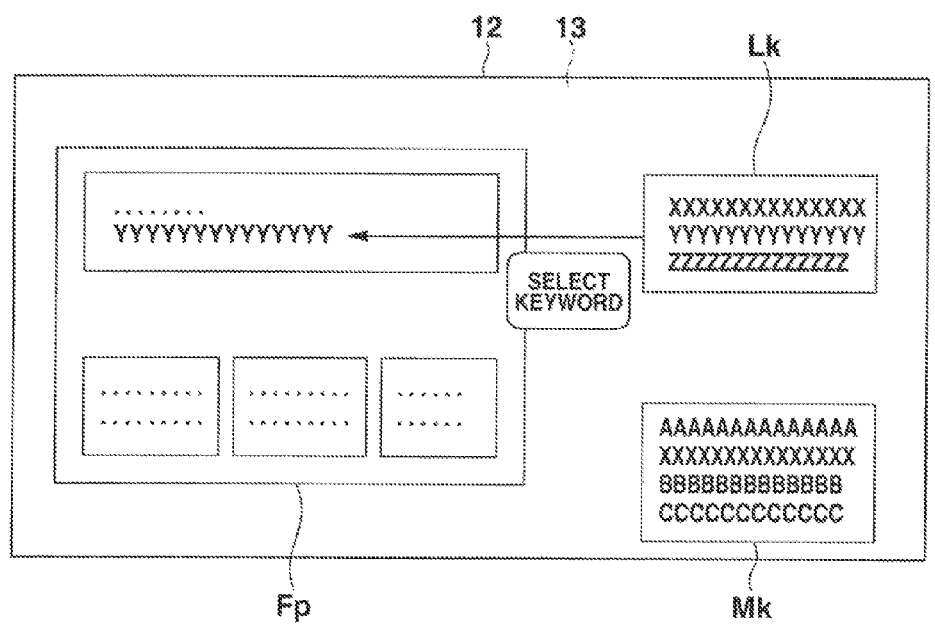
FIG. 18 is a view showing a presentation material form Fp used in the presentation material creation process of the keyword extractor 10.

FIG. 18 is a view showing a presentation material form Fp used in a presentation material creation process of the keyword extractor 10.

When a presentation material creation process in FIG. 17 is started up in response to an operation of a user (Step B1) after a keyword recording form Fk in which presented side (client) keywords (P) are classified into a client keyword region Kc and presenting side (salesclerk) keywords (T) and (Z) are classified into a salesclerk keyword region Ks has been created in accordance with the keyword recording (FIGS. 15 and 16), a message encouraging the user to display a list of keywords which have been recorded in the keyword recording form Fk or to terminate the process is displayed (Step B2).

Here, when the message to display the list of keywords is selected ("Yes" in Step B3), it is determined whether there are or not any keywords which have been recorded in the client keyword region Kc or the salesclerk keyword region Ks of the keyword recording form Fk (Step B4).

When it is first determined that presented side (client) keywords (P) 19C1 to 19Cn have been recorded in the client keyword region Kc of the keyword recording form Fk (Yes in both Steps B4 and B5), all the presented side (client) keywords (P) 19 C1 to 19Cn which have been recorded are read out and added onto a pen keyword list screen Lk displayed in a window on the display device 12 as shown in FIG. 18 (Step B6).

When it is then determined that presenting side (salesclerk) keywords (T) and (Z) 19S1 to 19Sn have been recorded in the salesclerk keyword region Ks of the keyword recording form Fk ("Yes" in Step B7), all the presenting side (salesclerk) keywords (T) and (Z) 19S1 to 195n which have been recorded are read out and added onto a touch keyword list screen Mk displayed in a window on the display device 12 (Step B8) as shown in FIG. 18. Then, the pen keyword list screen Lk and the touch keyword list screen Mk are compared with each other so that keywords which are coincident between a list on the pen keyword list screen Lk and a list on the touch keyword list screen Mk are highlighted and displayed in the lists.

In this manner, all the presented side (client) keywords (P) 19C1 to 19Cn and the presenting side (salesclerk) keywords (T) and (Z) 19S1 to 195n which have been classified and recorded in the keyword recording form Fk are classified and displayed in the respective lists on the pen keyword list screen Lk and the touch keyword list screen Mk which are displayed in the respective windows on the display device 12. Accordingly, the contents which drew client's attention and the contents which were emphasized by the salesclerk when the presentation was made by means of the presentation screen 14g can be compared with each other. In addition, the coincident keywords are highlighted so that consistent points and different points between the client's thought and the salesclerk's thought can be made clear. Thus, keywords regarded as highly important for future presentation can be known.

Then, when a keyword desired to be used as a new presentation material is selected from the respective keywords displayed in the lists on the pen keyword list screen Lk and the touch keyword list screen Mk ("Yes" in both Steps B9 and B10), the selected keyword is inputted into and displayed on a presentation material form Fp which is displayed adjacently to the pen keyword list screen Lk and the touch keyword list screen Mk (Step B11).

In this manner, keywords selected desirably from the keyword list screen Lk in which keywords regarded as important are listed and displayed sequentially in order of importance are inputted into and displayed on the presentation material form Fp as they are. Thus, new and suitable presentation materials can be created easily without any omission of the important keywords.

Accordingly, according to the keyword extraction function of the keyword extractor 10 having the aforementioned configuration, the presentation screen 14g is displayed on the display device 12 provided with the touch panel type input device 13. The presenting side (salesclerk) performs a touch operation or an enlargement operation with a finger or fingers on the presentation screen 14g, or the presented side (client) performs a touch operation with the pen likewise. In the touch operation with the finger or the touch operation with the pen, characters are recognized from an image of a region in a fixed range corresponding to coordinates of the touch position in the touch operation, and a keyword of a character string consisting of the recognized characters is extracted. In the enlargement operation, characters are recognized from an image of an enlarged region designated by the enlargement operation, and a keyword of a character string consisting of the recognized characters is extracted. The keyword extracted in accordance with the presenting side (salesclerk) operation region and the keyword extracted in accordance with the presented side (client) operation region are classified and stored in a keyword recording form Fk having a client keyword region Kc and a salesclerk keyword region Ks respectively.

Therefore, information which drew attention in a presentation can be recorded in a form which can serve for making materials for a future presentation.

Regions corresponding to touch operation positions designated with a finger on the presentation screen 14g may overlap with one another, or regions corresponding to touch operation positions designated with a pen likewise may overlap with one another. In this case, according to the keyword extraction function of the keyword extractor 10 having the aforementioned configuration, the region corresponding to the touch operation performed this time is added to the region corresponding to the touch operation performed last time so that a keyword consisting of characters recognized from an image of the operation region expanded thus can be extracted.

Therefore, it is possible to eliminate such a disadvantage that characters of one and the same keyword are recognized and extracted severally from an image of a portion where regions corresponding to a plurality of touch operations overlap with each other.

In addition, in each of the embodiments, the extracted keywords are used for a new presentation material form. The invention is not limited thereto. When one is selected from the extracted keywords, a keyword in the presentation screen 14g coincident with the selected keyword may be highlighted. In this case, a keyword extracted in response to a touch operation may be highlighted and displayed in another way than a keyword extracted in response to a pen operation. In this manner, keywords in which lots of clients are interested, keywords which have to be explained, etc. for a next presentation can be known so that the quality of the presentation can be improved. Even when another salesclerk performs operation, the quality of presentation can be maintained.

Incidentally, in each of the embodiments, keywords are extracted from one presentation. The invention is not limited thereto. Keywords which have been extracted a large number of times may be displayed in a list whenever presentation is made several times. In this case, keywords are extracted whenever a presentation is terminated. When there is a keyword coincident with one of the extracted keywords, a counter of the keyword is counted up. Thus, keywords which has been extracted a larger number of times can be displayed.

Incidentally, each of the techniques of the respective processes performed by the keyword extractor 10 described in the aforementioned embodiments, that is, each of the techniques of the keyword extraction process shown in the flow charts of FIGS. 6 to 8, the keyword recording shown in the flow chart of FIG. 15, the presentation material creation process shown in the flow chart of FIG. 17, etc. may be distributed as a program which is stored in a medium of an external storage device such as a memory card (an ROM card, an RAM card, etc.), a magnetic disk (a floppy disk, a hard disk, etc.), an optical disk (a CD-ROM, a DVD, etc.), or a semiconductor memory so that the program can be executed by a computer. In a computer (control device) of an electronic instrument provided with a display device 12, the program stored in the medium of the external storage device is read into a storage device so that operation of the electronic instrument can be controlled by the read program. In this manner, the keyword extraction function, the keyword recording function and the presentation material creation function in response to presentation operations described in the embodiments can be implemented so that the same processes based on the aforementioned techniques can be executed.

Incidentally, in the embodiments, keywords are extracted based on touched places. However, information to be extracted is not limited thereto. Images may be extracted or data associated with the touched places may be extracted.

In addition, data of the program for implementing each of the techniques may be transmitted as a form of program codes on a communication network. The data of the program can be imported into the computer (control device) of the electronic instrument provided with the display device 12 from a computer apparatus (program server) connected to the communication network and stored into the storage device so that the keyword extraction function, the keyword recording function and the presentation material creation function in response to presentation operations can be implemented.

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claim all such changes and modifications as fall within the true spirit and scope of the present invention.

What is claimed is:

1. An information processing apparatus comprising:
   a display device comprising a touch panel configured to receive a user operation and detect a touch position where the touch panel is touched by the user operation, wherein display information is displayed on the display device;
   a display information storage unit configured to store the display information;
   an information display controller configured to display the stored display information on the display device;
   a touch position acquisition unit configured to acquire the detected touch position in response to the user operation on the display information displayed on the display device;
   a region setting unit configured to set a certain region in the display information based on the acquired touch position;
   a target information extraction unit configured to extract a target information from the certain region of the display information;
   a target information storage unit configured to store the extracted target information; and
   a target information display controller configured to display the stored target information on the display device.

2. The apparatus according to claim 1, wherein
   the touch panel comprises:
      a first touch panel configured to detect a first touch position where the first touch panel is touched by a finger of the user; and
      a second touch panel configured to detect a second touch position where the second touch panel is touched by a pen,
   wherein the touch position acquisition unit is configured to acquire the first and second touch positions,
   wherein the target information extraction unit is configured to extract a first target information based on the acquired first touch position and to extract a second target information based on the acquired second touch position,
   wherein the target information storage unit is configured to store the extracted first and second target information such that the first target information is associated with the first touch position and the second target information is associated with the second touch position, and
   wherein the target information display controller is configured to display the first and second target information on the display device, respectively.

3. The apparatus according to claim 1, wherein
   the region setting unit comprises:
   a region overlapping determination unit configured to determine whether an existing region already set by the region setting unit and a new region newly set by the region setting unit overlap with each other or not; and
   an expanded region setting unit configured to update the existing region with an expanded region obtained by adding the new region to the existing region, when the region overlapping determination unit determines that the existing region and the new region overlap with each other.

4. The apparatus according to claim 1, wherein
   the touch position acquisition unit comprises an operation kind determination unit configured to determine the type of the user operation based on the detected touch position, and
   the touch position acquisition unit is configured to acquire the detected touch position in response to the determined type of the user operation,
   wherein the target information storage unit is configured to store the extracted target information such that the extracted target information is associated with the type of the user operation.

5. The apparatus according to claim 4, wherein
   the target information display controller is configured to display the stored target information on the display device in a certain order in accordance with the type of the user operation.

6. The apparatus according to claim 1, further comprising:
   a target information selector configured to select a certain information from target information displayed on the display device, in response to a user operation; and
   a display information generator configured to generate a new display information based on the selected information.

7. The apparatus according to claim 1, wherein
   the target information extraction unit is configured to extract a character string as the target information from the certain region of the display information through character recognition process.

8. The apparatus according to claim 1, wherein the display information is information for presentation.

9. The apparatus according to claim 2, wherein
   the target information display controller is configured to highlight the first and second target information which are coincide with desired information.

10. The apparatus according to claim 2, further comprising:
    an editing unit configured to highlight the extracted first and second target information.

11. The apparatus according to claim 10, wherein
    the editing unit is configured to highlight the first target information in a different manner as the second target information.

* * * * *